July 11, 1967  R. J. BARCHET  3,330,509
UNDERWATER LOADING OF STORES INTO WATER-BASED AIRCRAFT
Filed Sept. 17, 1956  5 Sheets-Sheet 1

INVENTOR
REINHOLD J. BARCHET
BY
Julian C. Renfro
ATTORNEY

July 11, 1967     R. J. BARCHET     3,330,509

UNDERWATER LOADING OF STORES INTO WATER-BASED AIRCRAFT

Filed Sept. 17, 1956     5 Sheets-Sheet 2

INVENTOR
REINHOLD J. BARCHET

BY *Julian C. Renfro*
ATTORNEY

July 11, 1967

R. J. BARCHET 3,330,509

UNDERWATER LOADING OF STORES INTO WATER-BASED AIRCRAFT

Filed Sept. 17, 1956

INVENTOR
REINHOLD J. BARCHET
BY
Julian C. Renfro
ATTORNEY

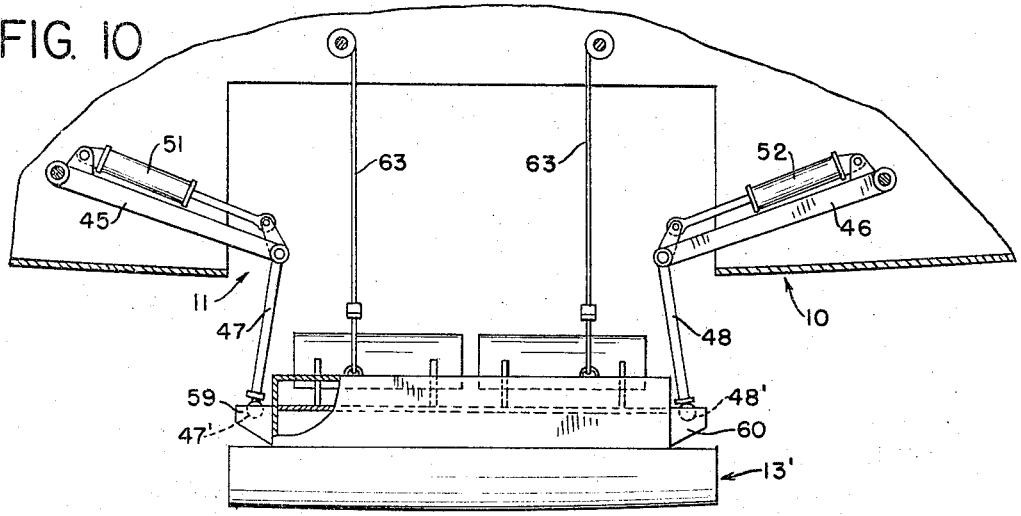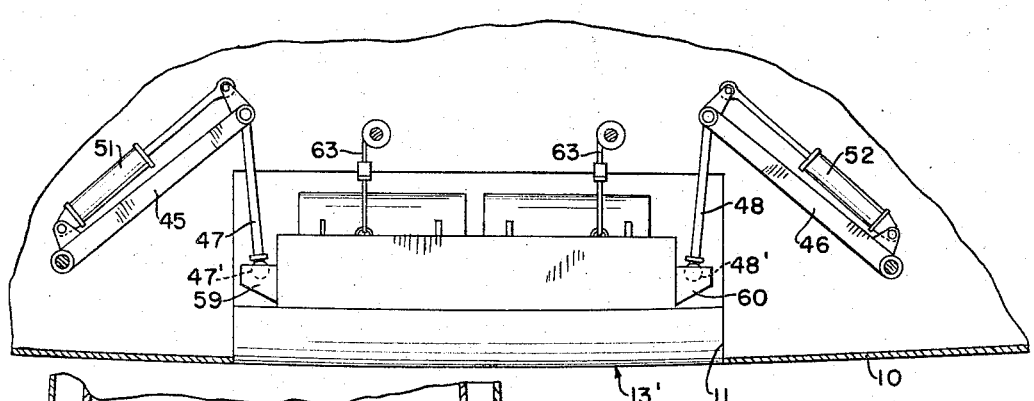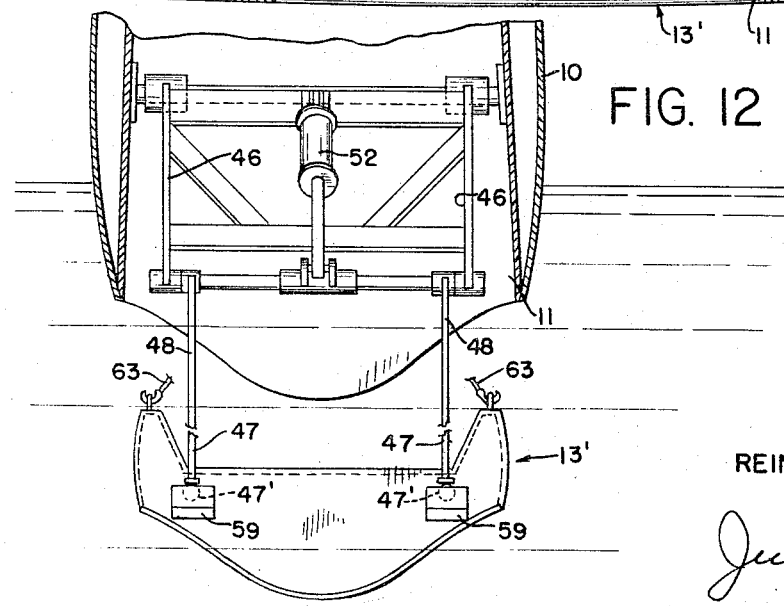

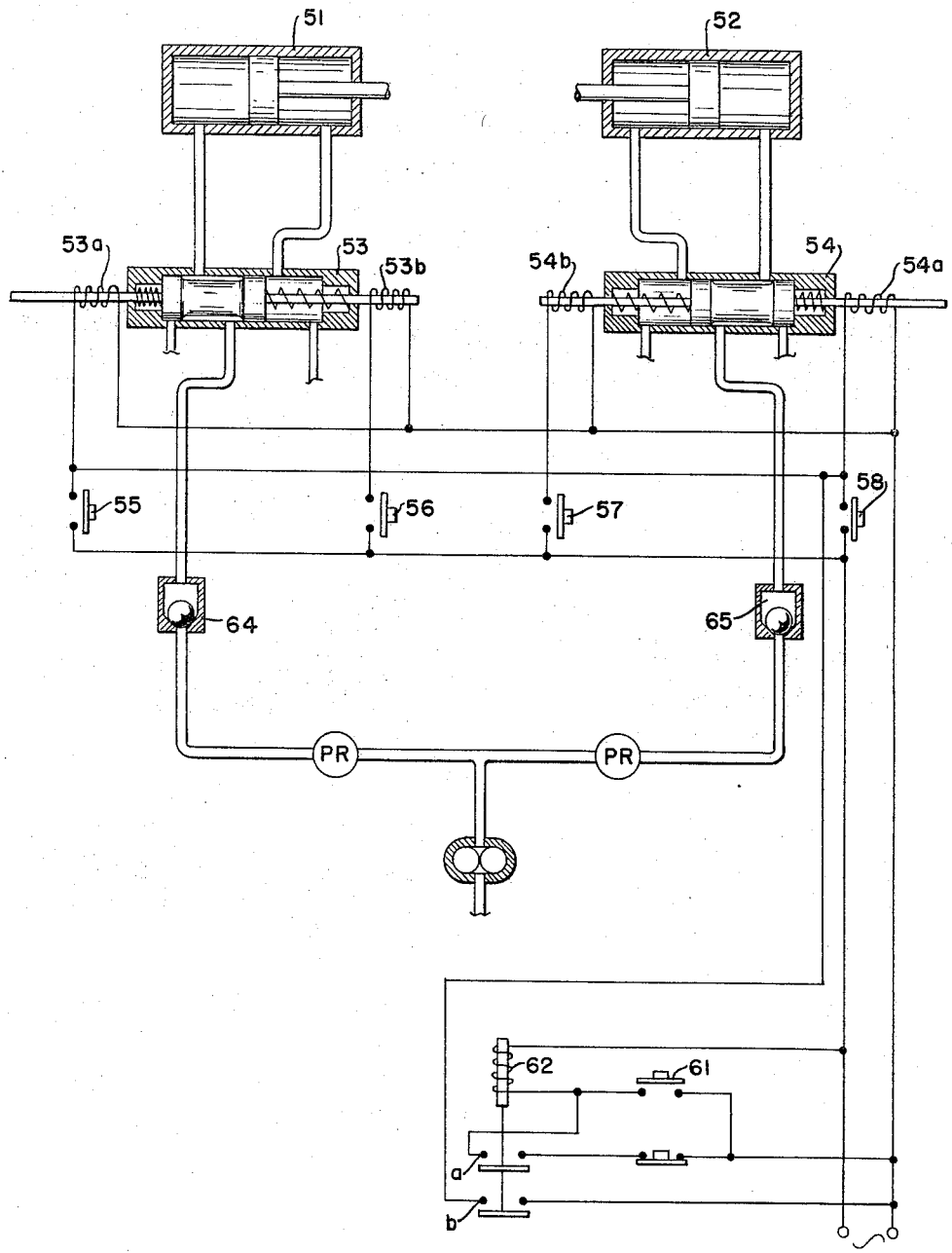

United States Patent Office 3,330,509
Patented July 11, 1967

3,330,509
UNDERWATER LOADING OF STORES INTO
WATER-BASED AIRCRAFT
Reinhold J. Barchet, Baltimore, Md., assignor to Martin-Marietta Corporation, a corporation of Maryland
Filed Sept. 17, 1956, Ser. No. 610,325
18 Claims. (Cl. 244—137)

The present invention relates to the loading of stores into water-based aicraft, and more particularly to an improved method and apparatus for loading stores into the hull of an aircraft while at sea.

It is often desirable to load stores or munitions into water-based aircraft while the aircraft is at sea. The stores may be supplied by a submarine or other vessel, and the aircraft is maneuvered into proximity with the supply vessel so that the stores may be transferred in the desired manner.

In the past, certain water-based aircraft have been provided with a pair of clam-shell doors opening at the top of the aircraft and permitting the loading of stores into the interior thereof. In such cases, the aircraft carries a crane which may be projected through the open doors to facilitate in the handling of the stores. This method of handling stores has been found to be time-consuming, and requires caution when loading in other than calm waters. Moreover, the clam-shell doors are non-structural and are carried as dead weight in flight, as are the crane and its associated equipment.

The present invention provides a novel and substantially improved arrangement for the loading of stores into water-based aircraft which effectively obviates the various disadvantages mentioned above. More specifically, the invention provides a novel method of and apparatus for the loading of stores into the bottom of the hull of a water-based aircraft, in which the stores are first lowered beneath the surface of the water and then drawn upwardly into the hull of the aircraft.

In accordance with the present invention, the aircraft is provided with a removable door in the bottom of its hull. The door may be removed from the aircraft and drawn beneath the surface of the water to the tending vessel, where the door is exchanged for a similar door carrying the desired stores. The loaded door is also lowered below the surface of the water and is drawn to the aircraft and fastened in place therein. The invention provides that a substantial portion of the weight of a loaded door is supported by the water, so that the hoist and allied apparatus carried by the aircraft may be of relatively small capacity and of correspondingly low weight.

In the apparatus of the invention, the stores carrying door serves as a pallet; and the door is of hollow construction and includes means to admit or exhaust sea water as may be desired. Thus, the hollow door may be at least partially flooded during loading and unloading operations so that the door will sink beneath the surface of the water. This may be so regulated that the door, with or without stores, is substantially weightless in the water. When the door is to be raised onto the deck of the tending vessel, or is raised into the hull of the aircraft, the sea water is exhausted or expelled from the door to reduce the weight thereof to a practical minimum.

For a better understanding of the invention, reference should be made to the following description and accompanying drawings, in which:

FIGS. 10–12 are fragmentary cross-sectional views of a modified form of the apparatus of the invention; and FIG. 13 is a simplified schematic representation of a control circuit employed in connection with the apparatus of FIGS. 10–12.

Figure 1:
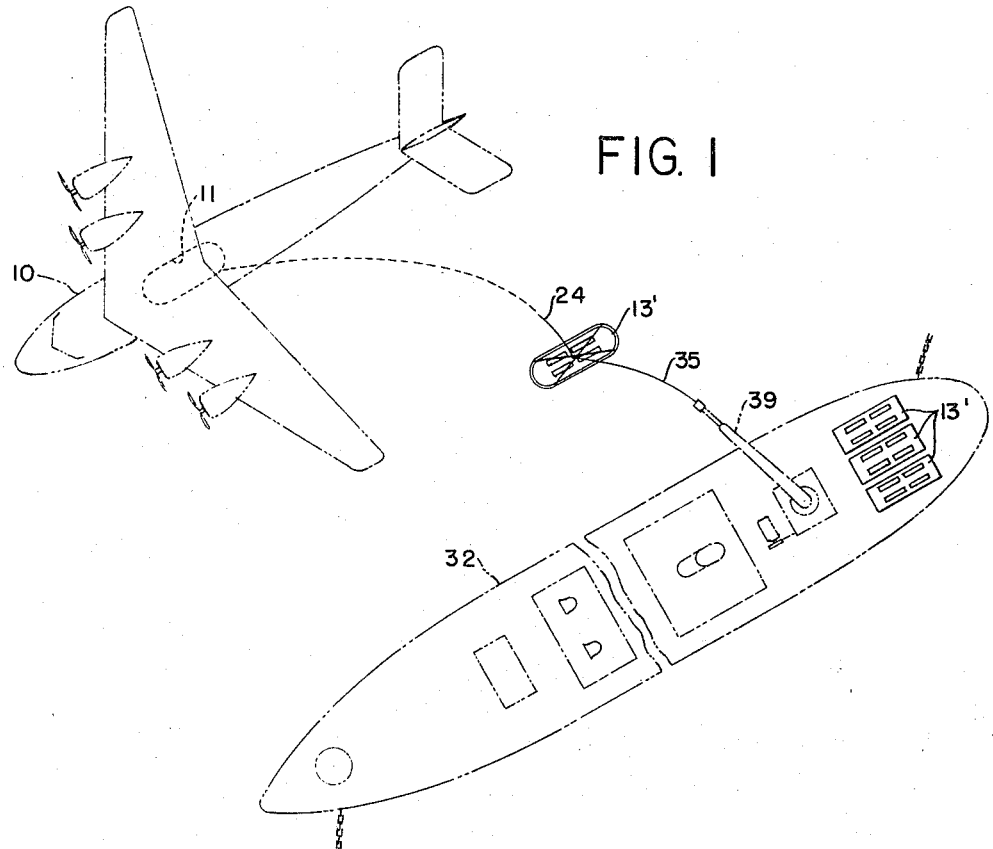
FIG. 1 is a simplified representation of a water-based aircraft and tending vessel transferring stores in accordance with the present invention.

In FIG. 1, the numeral 10 designates a conventional water-based aircraft which includes the improved apparatus of the present invention. The aircraft 10 has an opening 11 in the bottom of its hull leading into a cargo area 12 in the interior of the aircraft. The opening 11 is normally closed off by a door 13 removably received in the opening, and normally secured therein by suitable means, not shown.

In accordance with the invention, the door 13 is of hollow construction, and has a bottom wall 14 conforming generally with the contours of the hull of the aircraft and serving to maintain the continuity of the hull when the door is in place. The door 13 has a flat upper wall 15 joining at its side edges with upwardly and outwardly extending walls 16 and defining therewith a support for receiving the stores. The door 13 may be of a rotary or non-rotary type, as will be understood. If the door is of a rotary type, its outer side walls 17 will have convex arcuate contours, substantially as illustrated in FIGS. 2–9.

The walls 14–17, inclusive, of the door, together with the end walls 18 thereof, define a hollow chamber, in which is housed a valve 19 and pump 20. The valve 19 and pump 20 communicate with suitable openings, not specifically indicated, in the bottom wall of the door, and are respectively adapted to admit water into or expel it from the interior of the door, when properly actuated. In addition, vent valves 19a are provided in the walls 16 to admit or exhaust air as desired.

The cargo space 12 in the interior of the aircraft, is defined by walls 21, it being understood, however, that the entire cargo space is generally not available for the storage of cargo, particularly if the door employed is of the rotary type. The walls 21 support one or more hoists 22, which may be of more or less conventional design, having suitable driving and brake means. Each hoist 22 has a cable drum 23, upon which is carried a cable 24 of substantial length. At its end, the cable 24 connects with a junction block 25 having two short cables 26, 27 extending therefrom. The cables 26, 27 have hooks 26', 27' at their free ends which are adapted to be engaged with lugs 28 projecting upwardly from the fore and aft ends of the door 13. During flight and other normal operations of the aircraft 10, the hooks 26' and 27' are disengaged from the lugs 28, and the cable ends are held out of the way by hangers 29, on the compartment wall 21 (see FIG. 8).

Figure 2:
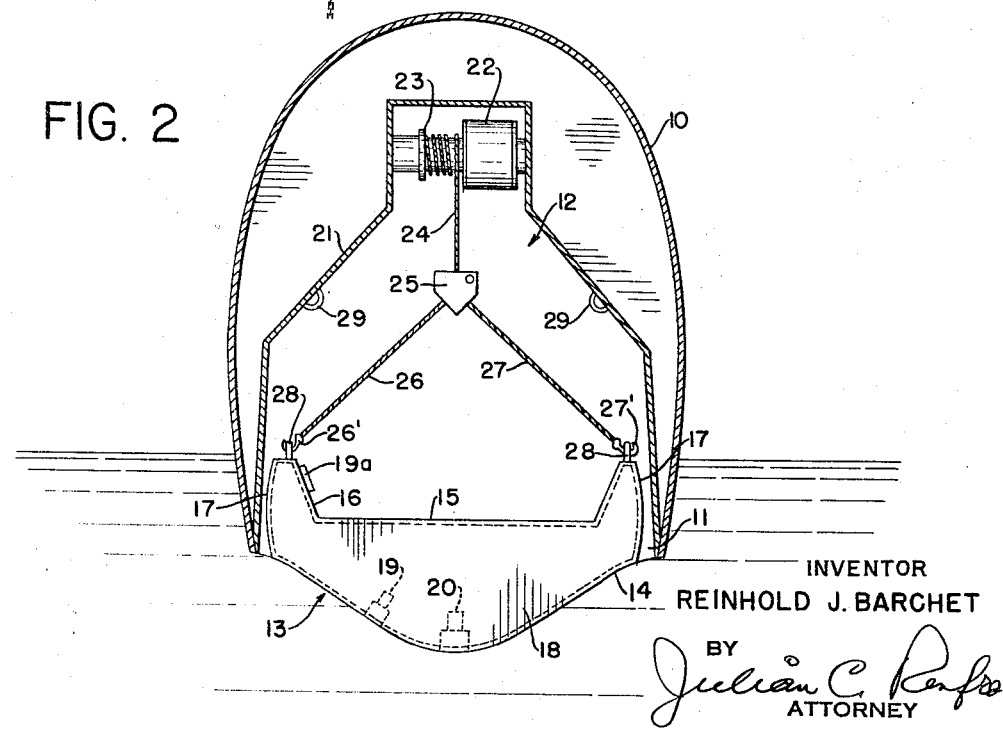
FIG. 2 is an enlarged cross-sectional view of an aircraft of the type shown in FIG. 1, showing the aircraft with a stores carrying door ready for removal therefrom.
Figure 8:
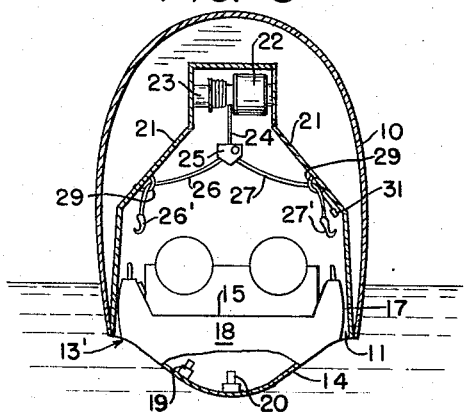

The main cable 24 has a power line (not specifically shown) extending throughout its entire length. The power line also extends along the cable 27 and has a connector plug 31 (FIG. 8) at its free end, near the hook 27', as shown in FIG. 8. The connector 31 is adapted to be removably attached to a mating connector part (not specifically shown) on the door 13. When the cables 26, 27 are connected to the door, as shown in FIG. 2, the connector fitting may be attached to the mating connector in the door to furnish electrical energy to the valves 19, 19a and pump 20.

In transferring stores to and from the aircraft 10, the aircraft may be maneuvered into a position alongside a supply vessel 32, for example, and anchored or otherwise retained in a position in which the wind and water currents will not cause a collision. At this time, the hooks 26′, 27′ are connected to the lugs 28 of the door 13, and the connector 31 is fitted with the corresponding connector part on the door. By means of suitable controls, not shown, the valves 19 and 19a in the door 13 are energized through the power line in such manner as to admit sea water into the interior of the door. In this respect, it will be observed in FIG. 2 that when the aircraft 10 lies at rest in the water substantially the whole of the door 13 is below the surface of the water, so that considerable pressure is available to force the sea water into the interior of the door.

Figure 3:
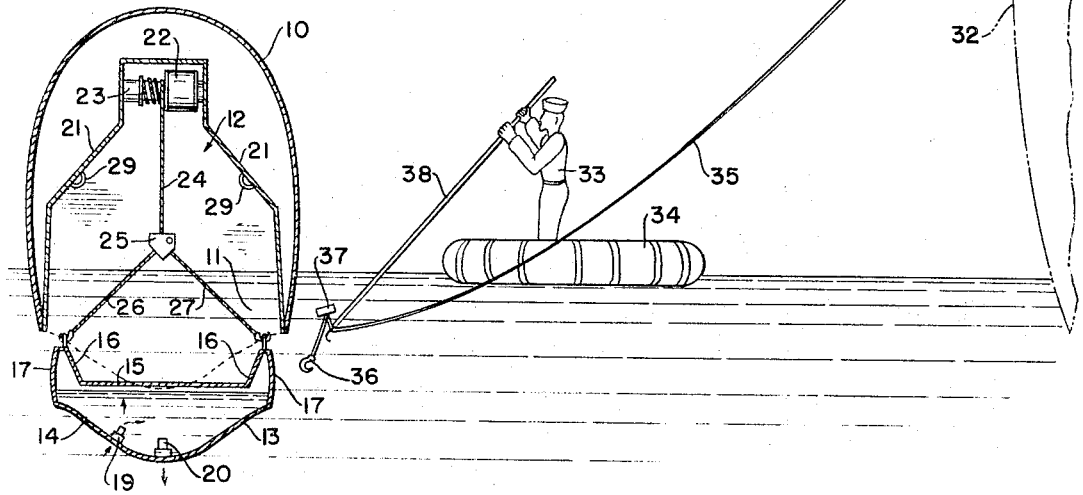
FIGS. 3–8 are sequential views illustrating the steps involved in transferring stores from the tending vessel to the aircraft.

After a short interval of time, the door 13 is fully flooded, and at this time the door is released from the hull of the aircraft and permitted by suitable control of the hoist brake to sink approximately five feet into the water. The lowered position of the door 13 is indicated in FIG. 3.

Outside of the aircraft 10, a crewman 33 in a small liferaft 34 handles a line 35 from the supply vessel 32. The line 35 has a hook 36 a its end, and a float 37 adjacent the hook adapted to support the hook 36 and line 35 near the surface of the water. By means of a pole 38 or other suitable device the crewman pushes the float 37 beneath the surface of the water and into the opening 11 in the bottom of the aircraft hull. The float is then released and allowed to rise to the surface of the water within the cargo chamber of the aircraft. When the float 37 appears at the surface within the chamber 12, a crewman within the plane retrieves the line and connects the hook 36 with the junction block 25.

When the line 35 on the supply vessel is thus connected with the door 13, the brake of the hoist 22 is released, and at the same time the slack in the line 35 is taken up by a crane 39 on the supply vessel. This causes the door 13 to move beneath the surface of the water into a position beside the supply vessel 32, substantially as indicated in FIG. 4.

Figure 4:
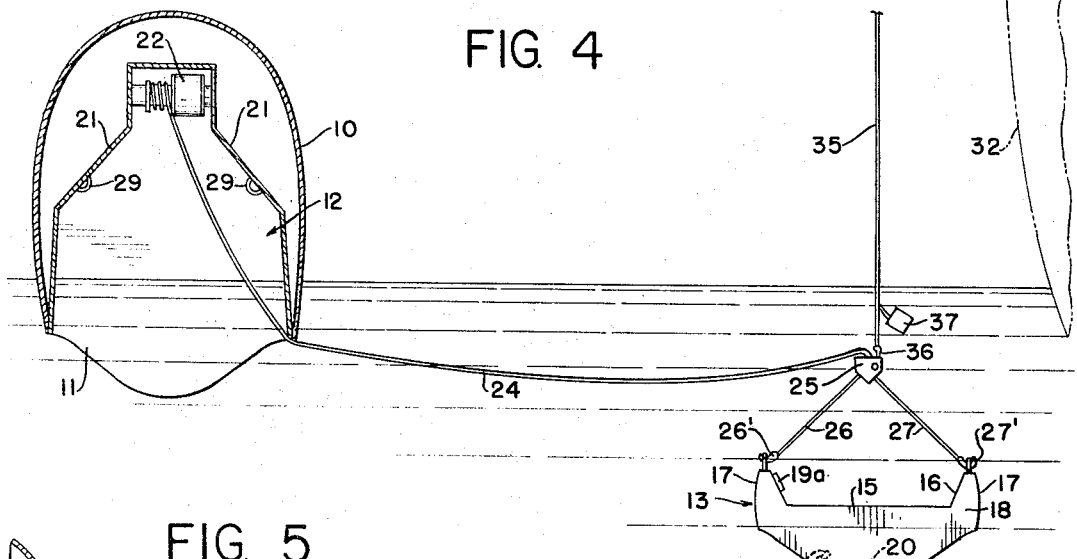
Figure 5:
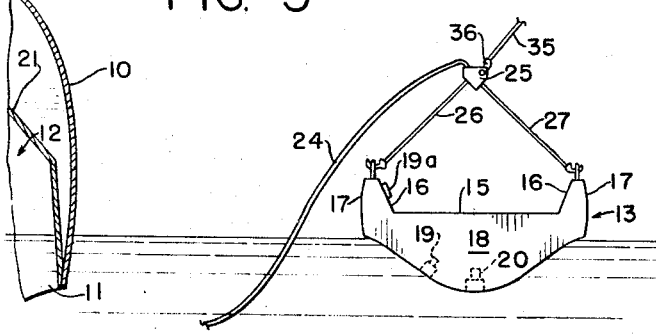

When the door 13 is in the position shown in FIG. 4, it is hoisted by the crane 39 to the surface of the water, whereupon the pump 20 is energized from the aircraft 10 to expel the sea water from the interior of the door. Vent valves 19a are also energized, when exposed above the surface of the water, to admit air into the interior of the door. After the water is thus expelled, the door 13 will float on the surface of the water, as indicated in FIG. 5, and may be readily hoisted onto the deck of the supply vessel 32.

Figure 6:
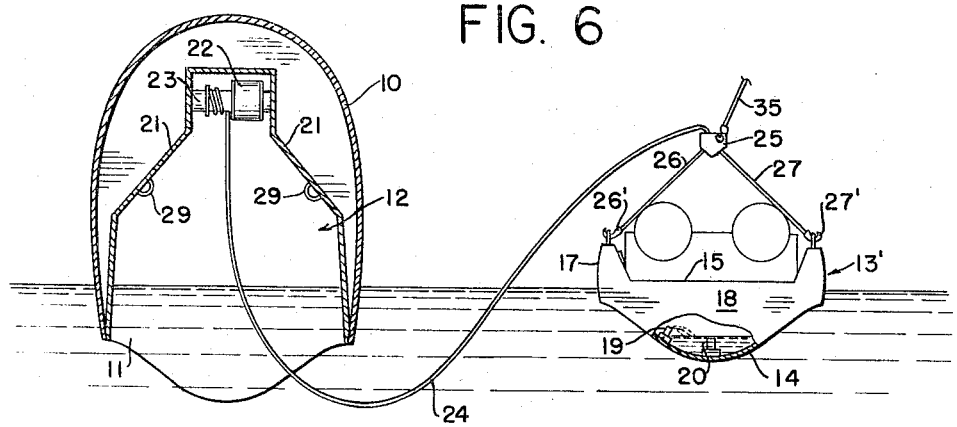

It is contemplated that the supply vessel 32 will have one or more interchangeable doors 13′ already loaded with stores or munitions. Thus, on the deck of the vessel, the empty door 13 is quickly changed for an identical door 13′ loaded with stores. The loaded door 13′ is connected in the same manner as the empty door 13, by connecting the hooks 26′, 27′ and power connector 31 to the door, the line 35 of the supply vessel remaining attached to the junction block 25. The loaded door is then lowered from the deck of the vessel 32 to the surface of the water, as shown in FIG. 6, and initially the door will float on the water due to its normal buoyancy. At this time, the line 35 from the supply vessel is disconnected, and the door may be drawn toward the aircraft. When the door is near the aircraft, the water and vent valves 19, 19a are energized to admit sea water into the door, causing the door to sink to a position directly below the aircraft, substantially as shown in FIG. 7.

Figure 7:
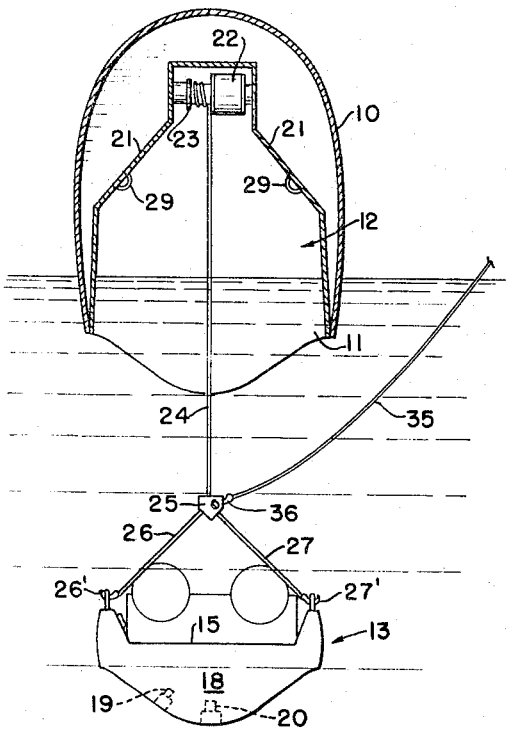

When the loaded door 13′ is in the position shown in FIG. 7, continued operation of the hoist 22 causes the door to be drawn upwardly into the opening 11, until the door reaches the position shown in FIG. 8. At this time the door is mechanically secured in the hull of the aircraft 10, by suitable means not shown. When the door is connected to the hull of the aircraft 10 and while the hooks 26′, 27′ are still attached thereto, the air vent valves 19a and pump 20 are energized to expel the sea water from the interior of the door. After the water is thus expelled, the hooks 26′, 27′ and power connector 31 are disengaged from the door, and the aircraft 10 is ready for flight.

Figure 9:
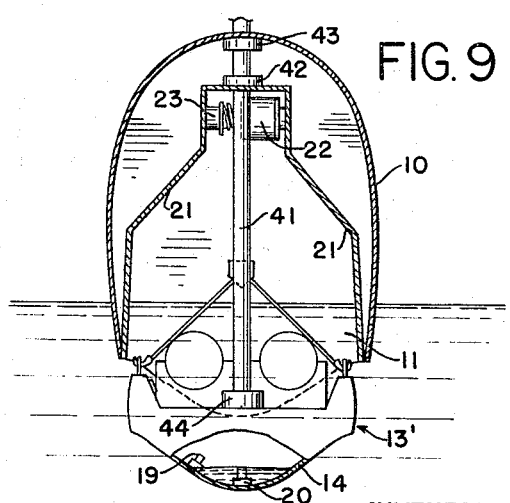
FIG. 9 is a cross-sectional view of an aircraft, showing aligning apparatus used in connection with the new apparatus.

In order to facilitate the loading operation in rough waters, it is desirable to provide means for aligning the loaded door 13′ with respect to the hull opening 11 prior to drawing the door upwardly into the hull of the aircraft. In the form of the apparatus shown in FIG. 9, there is provided for this purpose a pair of spaced guide members 41 which are slidably received in bearings 42, 43 in the aircraft frame structure. The guides 41 are inserted in the bearings 42, 43 prior to drawing the loaded door 13′ upwardly into the aircraft hull, and the guides 41 are of such length as to extend considerably below the hull of the aircraft. The bearings 42, 43 are of a type adapted, when released, to permit limited universal movement of the guides 41, but may be rigidly locked to hold the guides in vertical relation to the aircraft hull. Suitable sockets 44 are provided in the door 13′ to receive the lower ends of the guide members 41, substantially as shown in FIG. 9. Thus, the door 13 is engaged by the guides 41 when the door is below the hull of the aircraft, after which the bearings 42, 43 are locked in place. During further upward movements of the door it will be accurately guided into the hull opening 11 by the members 41. It is contemplated that the guide members 41 may be normally carried by the supply vessel. However, where the additional weight is of little importance, the guides may be stored on the aircraft.

In FIGS. 10–12 a modified form of the apparatus is shown wherein a pair of guide supports 45, 46 are pivotally mounted to the aircraft frame structure at opposite ends of the hull opening 11. The free ends of the guide supports 45, 46 project into the area above the hull opening 11, at each end thereof, and pivotally mount pairs of guide arms 47, 48 having spherical ends 47′, 48′. The guide arms 47, 48 have portions 49, 50, respectively, extending above the supports 45, 46 and connecting with the operating rods of hydraulic cylinders 51, 52. The arrangement is such that the guide arms 47, 48 may be pivoted with respect to the supports 45, 46 by appropriately actuating the cylinders 51, 52.

The cylinders 51, 52 are connected with a source of hydraulic fluid under pressure through suitable solenoid operated four-way valves 53, 54. Each valve 53, 54 has two operating coils 53a, 53b and 54a, 54b which may be independently energized by means of switches 55–58. By closing the switch 55, for example, the coil 53a is energized, shifting the spool of valve 53 to the left, as shown in FIG. 13. This admits fluid to the head end of the actuator 51 while exhausting fluid from the rod end thereof. Closing of the switch 56 energizes coil 53b, shifting the spool of valve 53 to the right and admitting fluid to the rod end thereof while exhausting fluid from the head end. Thus, by appropriate manipulation of switches 55, 56 arm 47 may be pivoted with respect to the support 45 therefor in the manner desired. Likewise, the guide arm 48 may be manipulated by selectively closing the switches 57, 58 controlling valve 54.

With the modified apparatus, when the loaded door 13′ is positioned beneath the aircraft hull opening 11, the supports 45, 46 are lowered and the arms 47, 48 are manipulated so that the spherical lower ends thereof are inserted in pairs of spherical sockets 59, 60 at the ends of the door 13′. After the door has been thus engaged, the arms 47, 48 are further manipulated to center the door with respect to the hull opening 11, substantially in the manner shown in FIG. 10.

When the door 13′ is centered in the opening 11, a switch 61 (FIG. 13) is closed to energize and close a relay 62. This causes contacts 62b of the relay to close and complete circuits to the energizing coils 53a, 54a of the valves 53, 54, respectively. The spools of both valves then shift to admit fluid to the head ends of the cylinders 51, 52. Hoists 63 in the aircraft 10 are then actuated to draw the door 13′ upwardly into the hull opening 11, and as this movement of the door takes place the guide arms 47, 48 pivot toward their respective supports 45, 46, such pivotal movement being assisted by the fluid pressure in the head ends of the cylinders 51, 52.

To prevent the door 13′ from shifting in a longitudinal direction with respect to the aircraft 10 while the door is being raised, check valves 64, 65 are provided in the fluid lines leading to the actuating cylinders 51, 52 to prevent a reverse flow of fluid in these lines. Thus, while fluid readily enters the head ends of the cylinders 51, 52, the fluid is trapped therein by the check valves 64, 65 so that reverse pivoting movement of the guide arms 47, 48 is prevented.

The advantages of the invention are readily apparent. With the new apparatus, the stores carrying door 13 serves as a pallet for the stores both on the supply vessel and in the aircraft. Thus, the supply vessel may carry a number of pre-loaded doors which may be quickly interchanged with an empty door taken from the aircraft to facilitate the transfer of stores from the vessel to the aircraft. Moreover, when the door is received in the aircraft and attached thereto it serves not only to support the stores but additionally to close off the aircraft hull opening and complete the hull contours thereof.

As an important feature of the invention, the stores carrying door is hollow and buoyant, and is provided with suitable pump and valve means whereby sea water may be admitted into or expelled from the interior of the door as desired. In handling the door, either loaded or unloaded, between the aircraft and supply vessel the door may be partially flooded with sea water to a point where it is substantially weightless in the water. This facilitates handling of the door and enables the use of lightweight, low capacity hoist equipment in the aircraft.

The invention also teaches a novel and improved method of transferring stores between an aircraft and supply vessel which makes most advantageous use of the improved equipment, and provides for the transferring of stores to be carried out in an easy and highly efficient manner.

It should be understood, however, that the new method and apparatus, as specifically described and illustrated herein, is intended to be illustrative only. Accordingly, reference should be made to the following appended claims in determining the full scope of the invention.

I claim:

1. The method of transferring stores at sea between a tending vessel and an aircraft of the type having a removable stores carrying door in its hull, which comprises positioning said aircraft in proximity to said vessel, lowering said door from said aircraft to a position below the surface of the water while supporting said door from said aircraft, engaging and supporting said door from said vessel and drawing said door toward said vessel, engaging a second door with said aircraft, lowering said second door from the vessel to the water, drawing said second door toward said aircraft and into a position below the hull thereof, drawing said second door upwardly into said hull, and securing said second door in position in said hull.

2. The method of claim 1, wherein said doors are at least partially flooded with sea water at times during the transferring operations.

3. The method of transferring stores at sea between a supply station and an aircraft of the type having a removable stores carrying door in its hull, which comprises positioning said aircraft in proximity to said station, substantially simultaneously lowering said door from said aircraft to a position below the surface of the water and at least partially flooding said door with sea water, engaging said door with said station, substantially simultaneously letting said door away from said aircraft and drawing said door toward said station, and exhausting said door of the sea water therein.

4. The method of transferring stores at sea between a supply station and an aircraft of the type having a removable stores carrying door in its hull, which comprise removing a stores carrying door from said aircraft lowering a stores carrying door from said station to the surface of the water, drawing the door toward said aircraft and submerging said door to a position beneath the hull of said aircraft, hoisting the thus positioned door into the hull of said aircraft, and securing the hoisted door to said aircraft.

5. The method of claim 4, wherein the said lowered door is submerged by at least partially flooding said door with sea water, and said door is exhausted of said sea water following said hoisting operation.

6. The method of claim 4, wherein the said door is engaged by said aircraft while positioned below said hull and is guided to said aircraft during said hoisting operation.

7. The method of transferring stores at sea between a supply station and an aircraft of the type having a removable stores carrying door in its hull, which comprises removing a stores carrying door from said aircraft, lowering a stores carrying door from said station to the surface of the water, transferring the door toward said aircraft and submerging the door below the surface of the water to a position below the hull of said aircraft, raising the thus-positioned door, and securing the raised door in the hull of said aircraft.

8. The method of claim 7, wherein the door is engaged by said aircraft before completion of said raising operation and is guided toward said hull during the last portion of said raising operation.

9. Apparatus for transferring stores at sea between a supply station and an aircraft comprising a stores carrying door of hollow construction, means in the hull of said aircraft for receiving and securing said door, a hoist in said aircraft for raising and lowering said door, valve means carried by said door and actuable to at least partially flood said door with sea water to enable said door to be lowered from said aircraft beneath the surface of the water, and pump means carried by said door and actuable to exhaust sea water from said door.

10. Apparatus according to claim 9, further characterized by said doors having bottom surface contours complementary to the bottom surface contours of said hull, said door being adapted to be received in said hull in such manner that the bottom surface of said door is a continuation of the bottom surface of said hull.

11. Apparatus according to claim 9, further characterized by said valve and pump means being electrically actuated, and further including an extensible electrical power line carried by said aircraft, and detachable connector means for connecting said power cable to said door.

12. Apparatus for transferring stores at sea between a supply station and an aircraft comprising a stores carrying door of hollow construction, means in the hull of said aircraft for receiving and securing said door, means carried by the aircraft for engaging said door and raising and lowering said door with respect to said aircraft, means carried by said door and actuable to admit sea water into or exhaust sea water from said door to assist in the raising and lowering of said door.

13. Apparatus according to claim 12, further including means carried by said aircraft and adapted to be extended below the hull thereof for engaging a door submerged below the hull of said aircraft for guiding said door toward said hull.

14. Apparatus according to claim 12, further including extendible means for engaging said aircraft and door when said door is submerged below the hull of said aircraft for guiding said door toward said hull.

15. Apparatus according to claim 14, further characterized by said extendible means comprising arms retractably carried by said aircraft and adapted to be extended downwardly therefrom toward a door submerged below said hull, and said door having means for engaging said arms whereby the door is guided toward said hull.

16. Apparatus according to claim 15, further characterized by said arms being pivotally mounted, and further including actuator means for moving said pivotally mounted arms to effect the engagement of said arms with said door and to effect the alignment of said door with said hull.

17. Apparatus according to claim 16, further characterized by said actuator means comprising hydraulic actuators, first control means for said actuators for effecting independent movement of said pivotally mounted arms, and second control means for said actuators for effecting interrelated movement of said pivotally mounted arms.

18. Apparatus according to claim 16, further characterized by the said pivotally mounted arms being adapted for fore and aft movement with respect to the hull of said aircraft, and said actuator means being adapted to prevent pivotal movement of said arms in one direction.

References Cited
UNITED STATES PATENTS

| | | | |
|---|---|---|---|
| 1,694,108 | 12/1928 | Stein | 114—0.5 |
| 2,387,527 | 10/1945 | Nagamatsu | 244—118 |
| 2,448,862 | 9/1948 | Conklin | 244—137 |
| 2,689,696 | 9/1954 | Gannon | 244—118 |

FOREIGN PATENTS

| | | |
|---|---|---|
| 739,715 | 10/1932 | France. |
| 917,337 | 9/1946 | France. |

MILTON BUCHLER, *Primary Examiner.*

SAMUEL BOYD, BENJAMIN A. BORCHELT,
*Examiners.*

R. W. ERICKSON, A. E. CORRIGAN
*Assistant Examiners.*